United States Patent
Fukaya (10) Patent No.: US 12,520,041 B2
(45) Date of Patent: Jan. 6, 2026

(54) IMAGING APPARATUS, METHOD FOR CONTROLLING THE SAME, AND STORAGE MEDIUM

(71) Applicant: CANON KABUSHIKI KAISHA, Tokyo (JP)

(72) Inventor: Yudai Fukaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 18/497,782

(22) Filed: Oct. 30, 2023

(65) Prior Publication Data

US 2024/0147066 A1 May 2, 2024

(30) Foreign Application Priority Data

Oct. 31, 2022 (JP) ................. 2022-174675

(51) Int. Cl.
| | |
|---|---|
| H04N 23/67 | (2023.01) |
| G06F 3/14 | (2006.01) |
| G06T 5/50 | (2006.01) |
| G06T 7/20 | (2017.01) |
| G06V 10/25 | (2022.01) |
| G06V 10/74 | (2022.01) |

(52) U.S. Cl.
CPC ............ *H04N 23/675* (2023.01); *G06F 3/14* (2013.01); *G06T 5/50* (2013.01); *G06T 7/20* (2013.01); *G06V 10/25* (2022.01); *G06V 10/761* (2022.01); *G06T 2207/20221* (2013.01); *G06V 2201/07* (2022.01)

(58) Field of Classification Search
CPC .... H04N 23/675; H04N 23/635; H04N 23/61; H04N 23/611; G06F 3/14; G06T 5/50; G06T 7/20; G06T 2207/20221; G06V 10/25; G06V 10/761; G06V 2201/07; G06V 40/10
See application file for complete search history.

(56) References Cited

U.S. PATENT DOCUMENTS

2010/0321534 A1* 12/2010 Kim ....................... G06T 11/00
  348/E5.022
2022/0337743 A1* 10/2022 Saito ..................... H04N 23/60

FOREIGN PATENT DOCUMENTS

WO      2010150348 A1     12/2010

* cited by examiner

*Primary Examiner* — Shahbaz Nazrul
(74) *Attorney, Agent, or Firm* — Canon U.S.A., Inc., IP Division (57) ABSTRACT

An imaging apparatus includes an image sensor, a memory configured to store images, and at least one processor or circuit configured to function as the following units, a recognition unit configured to recognize a person based on images captured by the image sensor, an approach detection unit configured to detect approach of an object to the imaging apparatus, a focus adjustment unit configured to adjust a focusing state of a subject based on the images captured by the image sensor, and a generation unit configured to generate a moving image based on images captured by the image sensor and images stored in the memory, wherein, when the approach detection unit detects the approach of the object to the imaging apparatus, the focus adjustment unit changes a focus adjustment target.

15 Claims, 5 Drawing Sheets

IMAGING APPARATUS, METHOD FOR CONTROLLING THE SAME, AND STORAGE MEDIUM

BACKGROUND

Field

The present disclosure relates to an imaging apparatus for capturing a moving image, a method for controlling the imaging apparatus, and a storage medium.

Description of the Related Art

In recent years, moving image distribution sites commonly distribute moving images captured by individuals.

In an example case where a product is presented in moving image distribution by an individual, the performer who presents the product on the screen is often the same person as the photographer who photographs the performance.

Such a case involves an issue that the performer can hardly operate the imaging apparatus and focus on the intended object during photographing.

SUMMARY

According to an aspect of the present disclosure, an imaging apparatus includes an image sensor, a memory configured to store images, and at least one processor configured to function as the following units, a recognition unit configured to recognize a person based on images captured by the image sensor, an approach detection unit configured to detect approach of an object to the imaging apparatus, a focus adjustment unit configured to adjust a focusing state of a subject based on the images captured by the image sensor, and a generation unit configured to generate a moving image based on images captured by the image sensor and images stored in the memory, wherein, when the approach detection unit detects the approach of the object to the imaging apparatus, the focus adjustment unit changes a focus adjustment target.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings.

Configuration of Imaging Apparatus

Figure 1:
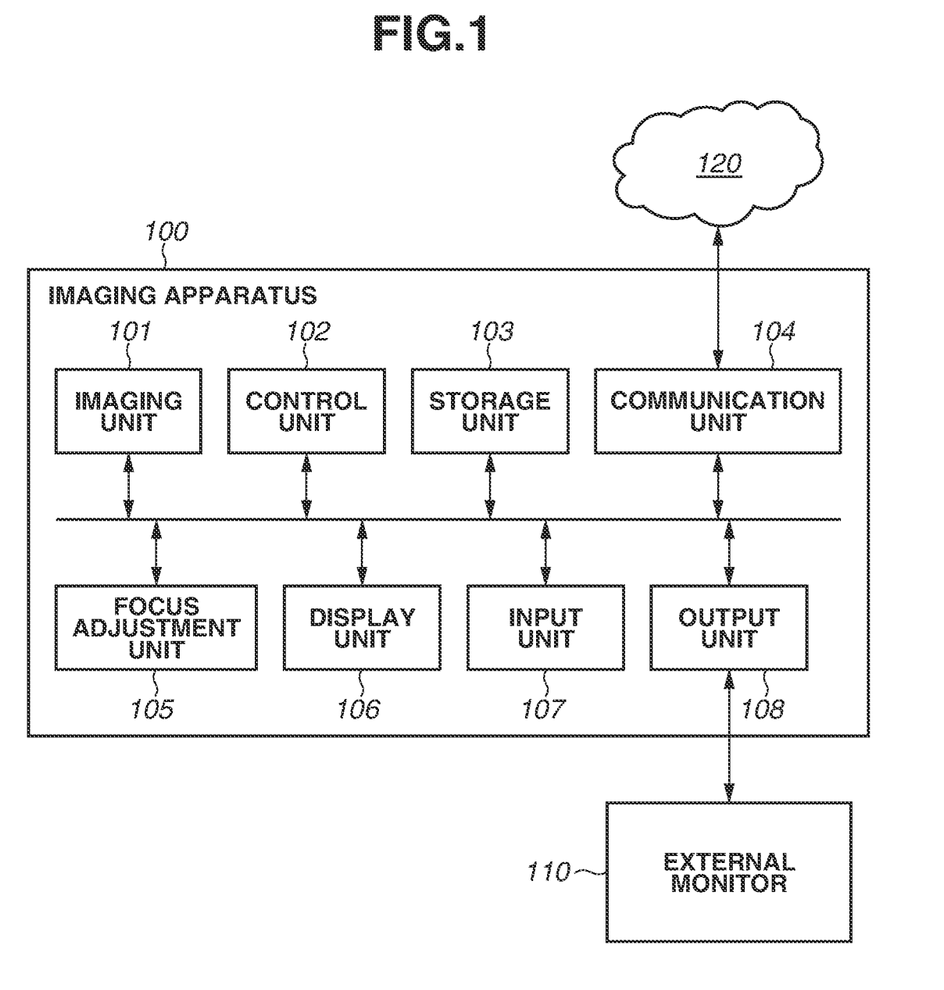
FIG. 1 illustrates an example of a configuration of an imaging apparatus according to a first exemplary embodiment.

FIG. 1 illustrates a configuration of an imaging apparatus 100 as an example of an imaging apparatus according to the present disclosure.

The imaging apparatus 100 includes an imaging unit 101, a control unit 102, a storage unit 103, a communication unit 104, a focus adjustment unit 105, a display unit 106, an input unit 107, and an output unit 108. The imaging apparatus 100 is connectable with an external monitor 110 and an external network 120 and configured to transmit and receive image information and necessary non-image information.

The imaging unit 101 includes an imaging optical system 201, a mechanical shutter 202, and an image sensor 203 to be described below with reference to FIG. 2. The imaging optical system 201, the mechanical shutter 202, and the image sensor 203 convert the optical image of a subject into digital data and transmit the data to the control unit 102 as a captured image.

The control unit 102 includes a Central Processing Unit (CPU) and a program memory and executes a predetermined program to control the imaging apparatus 100 according to the present exemplary embodiment. The control unit 102 also subjects captured images received from the imaging unit 101 to image processing to detect a subject, and combines different images to generate a moving image.

The storage unit 103 as a rewritable volatile memory stores image information including still and moving images and necessary non-image information. Image information to be stored also includes specific image information. Specific image information will be described below with reference to FIG. 3.

The communication unit 104 includes an interface circuit for communicably connecting the imaging apparatus 100 with an external apparatus via a network such as the Internet. The communication unit 104 also enables data transmission and reception to/from an external apparatus wiredly or wirelessly connected with the external network 120.

The focus adjustment unit 105 includes a drive control circuit for driving lenses, and a focus detection circuit for detecting information about the subject distance. The focus adjustment unit 105 transmits the information about the subject distance detected by the focus detection circuit to the control unit 102 to activate the drive control circuit based on an instruction signal from the control unit 102. Then, the drive control circuit controls the imaging optical system 201 of the imaging unit 101 to adjust the focusing state and the depth of object.

The display unit 106 including a display device such as a liquid crystal panel or an organic electroluminescence (EL) device displays images from the imaging unit 101.

The input unit 107 including switches, buttons, a touch panel, and a microphone receives user operations. The microphone of the input unit 107 inputs the sound of a moving image.

The output unit 108 including a speaker and light emitting diode (LED) informs the user of information with sound and light. The output unit 108 also outputs sound data of a moving image to the external monitor 110.

The external monitor 110, a liquid crystal display monitor outside the imaging apparatus 100, displays images received from the imaging apparatus 100.

The external network 120 includes network cables, modems, routers, servers, and other network devices. The imaging apparatus 100 can distribute moving images to viewers via the external network 120. Moving images may be directly transmitted from the control unit 102 to the external network 120 via the communication unit 104, or may be once stored in the storage unit 103 and then transmitted to the external network 120 via the communication unit 104. When a moving image is once stored in the storage unit 103, the distributor can edit the moving image. When directly transmitting a moving image from the control unit 102 to the external network 120 via the communication unit 104, the moving image is used for real-time live distribution.

Configuration of Imaging Unit 101 According to First Exemplary Embodiment

A first exemplary embodiment will be described in detail below.

Figure 2:
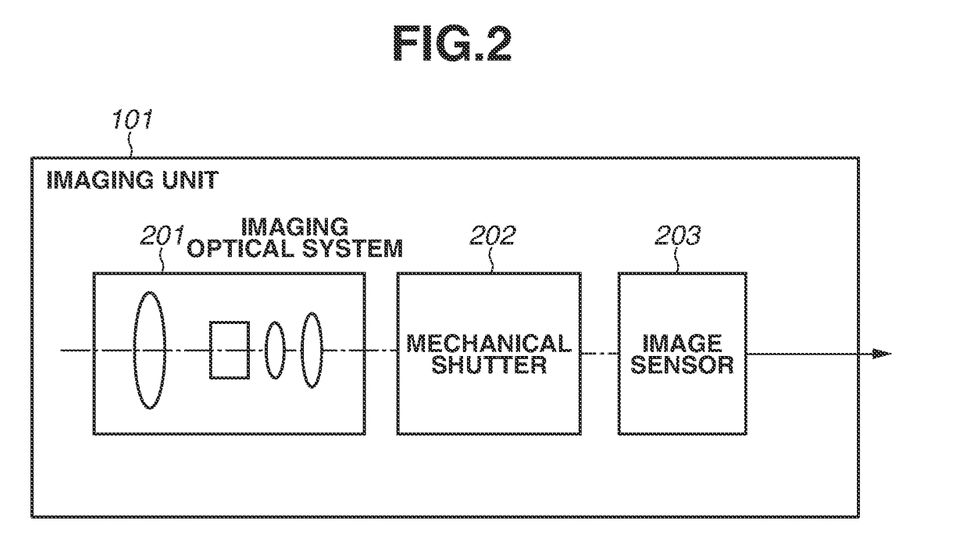
FIG. 2 illustrates a configuration of an imaging unit according to the first exemplary embodiment.

FIG. 2 illustrates a configuration of the imaging unit 101 according to the first exemplary embodiment.

The imaging unit 101 includes the imaging optical system 201, the mechanical shutter 202, and the image sensor 203 as described above.

The imaging optical system 201 including a diaphragm, camera shake correction lens, focusing lens, and zoom lens guides the optical image of the subject to the image sensor 203 via the mechanical shutter 202. The mechanical shutter 202 adjusts the exposure time during which the image sensor 203 is exposed. The image sensor 203 photoelectrically converts an optical image formed by the lenses to generate an image signal. If the imaging apparatus 100 is provided with the electronic shutter function that controls the signal storage time and signal read time to adjust the exposure time, the mechanical shutter 202 is not required.

Control Processing of Imaging Apparatus 100 According to First Exemplary Embodiment Control processing of the imaging apparatus 100 according to the first exemplary embodiment will be described below.

Figure 3:
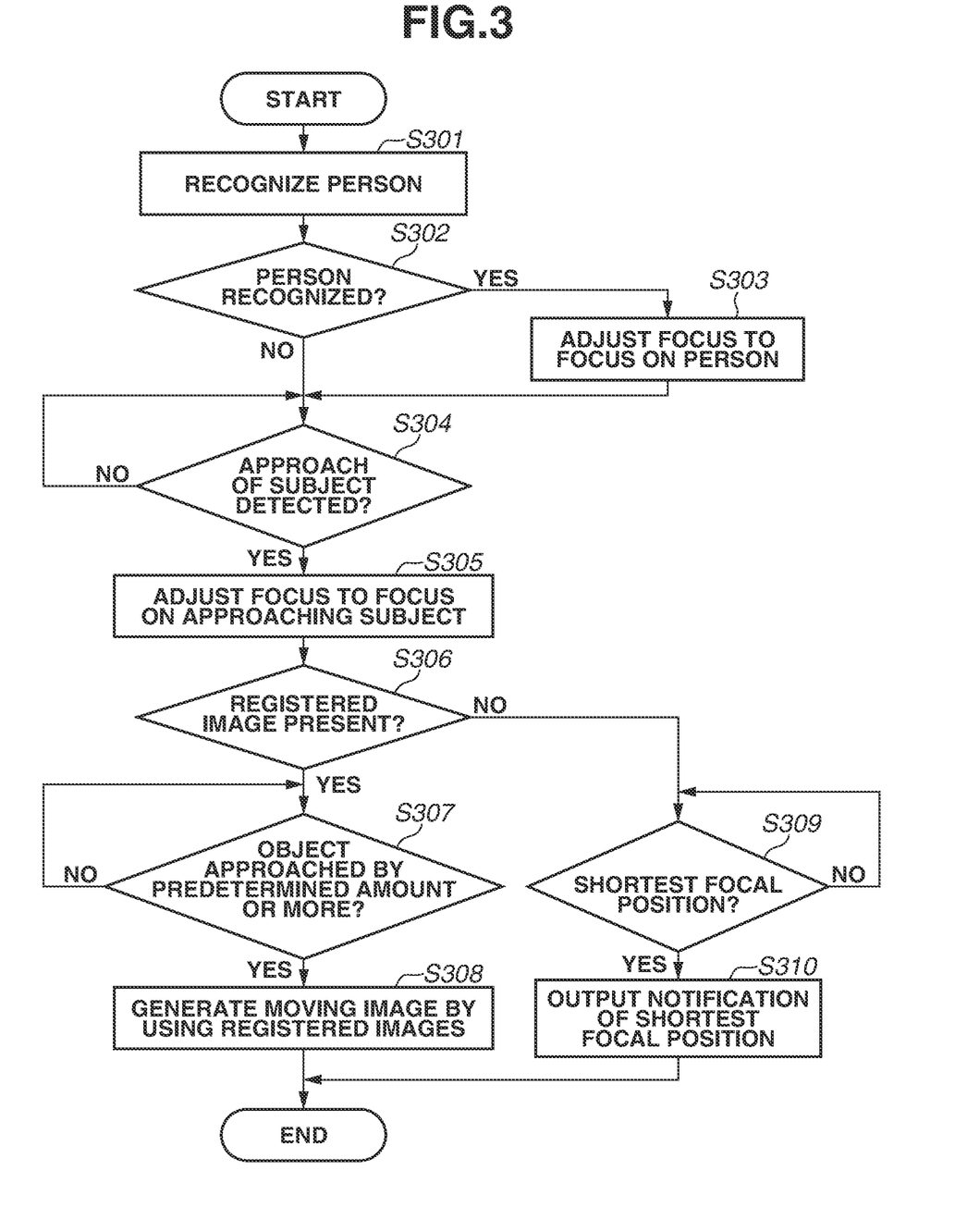
FIG. 3 illustrates control processing when an object approaches according to the first exemplary embodiment.

FIG. 3 illustrates control processing of the imaging apparatus 100 when an object as a non-person subject approaches. For example, a scene such as "in order to show the object in more detail, a person moves the object closer to the imaging apparatus 100." is assumed.

In step S301, the control unit 102 subjects the captured images received from the imaging unit 101 to image processing to recognize a person. In person recognition, the control unit 102 recognizes a person from the captured images based on prestored shape and color information regarding the face, eyes, head, and body of each of a plurality of persons. This person detection processing uses a known image recognition method. In this case, it is preferable that the control unit 102 closes the diaphragm of the imaging unit 101 most to widen the range of the depth of field. However, if no person can be detected, the control unit 102 may close the diaphragm to enable person detection. In step S302, the control unit 102 determines whether a person is detected in step S301. When a person is detected (YES in step S302), the processing proceeds to step S303. In step S303, the control unit 102 controls the focus adjustment unit 105 to focus on the detected person, thus implementing focus adjustment on the person. The control unit 102 adjusts the imaging optical system 201 including the lenses and diaphragm via the focus adjustment unit 105 to clarify the target person.

In step S304, the control unit 102 determines whether the approach of the subject (object) is detected based on the focus detection result by the focus detection circuit of the focus adjustment unit 105. In this case, when the control unit 102 determines that the subject is approaching based on the focus detection result, the control unit 102 detects that the subject is close. Alternatively, the control unit 102 may detect that the subject is close when the subject distance is equal to or less than a predetermined distance for a predetermined time duration. The control unit 102 repeats the detection operation at predetermined intervals until the object approach is detected. When the object approach is detected (YES in step S304), the processing proceeds to step S305. The control unit 102 may determine whether the object approach is detected, based on the ratio of the object region to the angle of view through the image processing on the captured images.

In step S305, since the control unit 102 detects the object approach in step S304, the control unit 102 controls the focus adjustment unit 105 to focus on the approaching object, thus implementing focus adjustment on the object.

In step S306, the control unit 102 determines whether a registered image is present in the storage unit 103. When the control unit 102 determines that a registered image is present (YES in step S306), the processing proceeds to step S307. On the other hand, when the control unit 102 determines that no registered image is present (NO in step S306), the processing proceeds to step S309. Registered images refer to focused object images captured and pre-registered in the storage unit 103 by the performer (distributor). Registered images may be still images and moving images. Registered images may be object-related images, for example, enlarged images for checking object portions in detail or the entire object images.

When a moving image is generated by using registered images, the sound input by the input unit 107 is used.

In step S307, the control unit 102 determines whether the object has approached by a predetermined amount or more. The control unit 102 repeats the detection operation at predetermined intervals until it detects the object approach by the predetermined amount or more. When the control unit 102 detects the object approach by the predetermined amount or more (YES in step S307), the processing proceeds to step S308.

In step S308, the control unit 102 performs moving image generation processing for inserting an image registered in the storage unit 103 into the captured images received from the imaging unit 101, and terminates the control processing when the object approaches. When generating a moving image by using registered images, the control unit 102 may display the registered images in the full screen or superimpose the registered images on the captured images to generate a moving image.

In step S309, since the control unit 102 determines that no registered image is present in step S306, the control unit 102 determines whether the object further approaches and reaches the shortest focal position where the focus can be adjusted by the focus adjustment unit 105. The control unit 102 repeats the detection processing at predetermined intervals until the object reaches the shortest focal position. When the control unit 102 determines that the object reaches the shortest focal position (YES in step S309), the processing proceeds to step S310. Although, in the above-described processing, the control unit 102 determines whether the object reaches the shortest focal position, the control unit 102 may determine whether the object reaches the vicinity of the shortest focal position.

In step S310, the control unit 102 outputs a notification for notifying the user that the object reaches the shortest focal position via a display device such as an LED of the output unit 108 or the display unit 106, and terminates the control processing when the object approaches. In this case, the control unit 102 functions as a display control unit.

The above-described control processing of the imaging apparatus 100 according to the present exemplary embodiment enables the performer to capture in-focus images and generate a moving image as intended by the performer. In this case, the performer as a person does not operate the camera but brings the object as a non-person subject close to the camera. The object may be a product held by a person or a cloth worn by a person.

Figure 4:
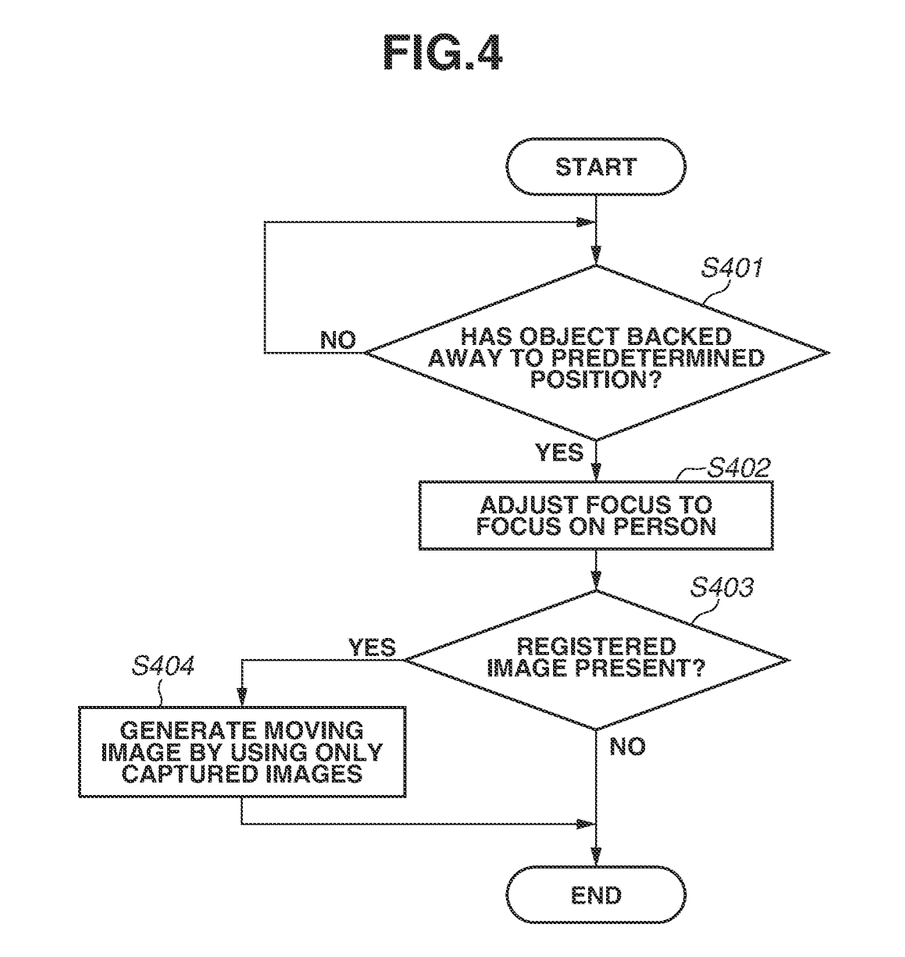
FIG. 4 illustrates control processing when the object backs away according to the first exemplary embodiment.

FIG. 4 illustrates control processing of the imaging apparatus 100 when the object as a non-person subject backs away. The control processing when the object backs away is performed after completion of the control processing when the object approaches illustrated in FIG. 3.

In step S401, the control unit 102 determines whether the object has backed away via the focus detection circuit of the focus adjustment unit 105. The control unit 102 determines that the object has backed away, for example, when the control unit 102 determines that the object has returned to the position where the focus adjustment target has been changed to the object. The control unit 102 performs the detection processing at predetermined intervals until the object backing away is detected. When the control unit 102 determines that the object has backed away (YES in step S401), the processing proceeds to step S402.

In step S402, the control unit 102 changes the focus adjustment target by the focus adjustment unit 105 to a person. If no person is detected, the control unit 102 focuses on a predetermined position such as the center of the screen.

In step S403, the control unit 102 determines whether a registered image is present in the storage unit 103. When the control unit 102 determines that a registered image is present (YES in step S403), the processing proceeds to step S404. On the other hand, when the control unit 102 determined that no registered image is present (NO in step S403), the processing exits this control processing since a moving image is generated by using only captured images.

In step S404, the control unit 102 generates a moving image by using the captured images received from the imaging unit 101 without using the registered images stored in the storage unit 103. Then, the processing exits this control processing.

The above-described control processing of the imaging apparatus 100 according to the present exemplary embodiment enables the performer to capture in-focus images and generate a moving image as intended by the performer. In this case, the performer as a person does not operate the camera but brings the object as a non-person subject away from the camera.

A second exemplary embodiment will be described below.

Configuration of Imaging Unit 101 According to Second Exemplary Embodiment

Figure 5:
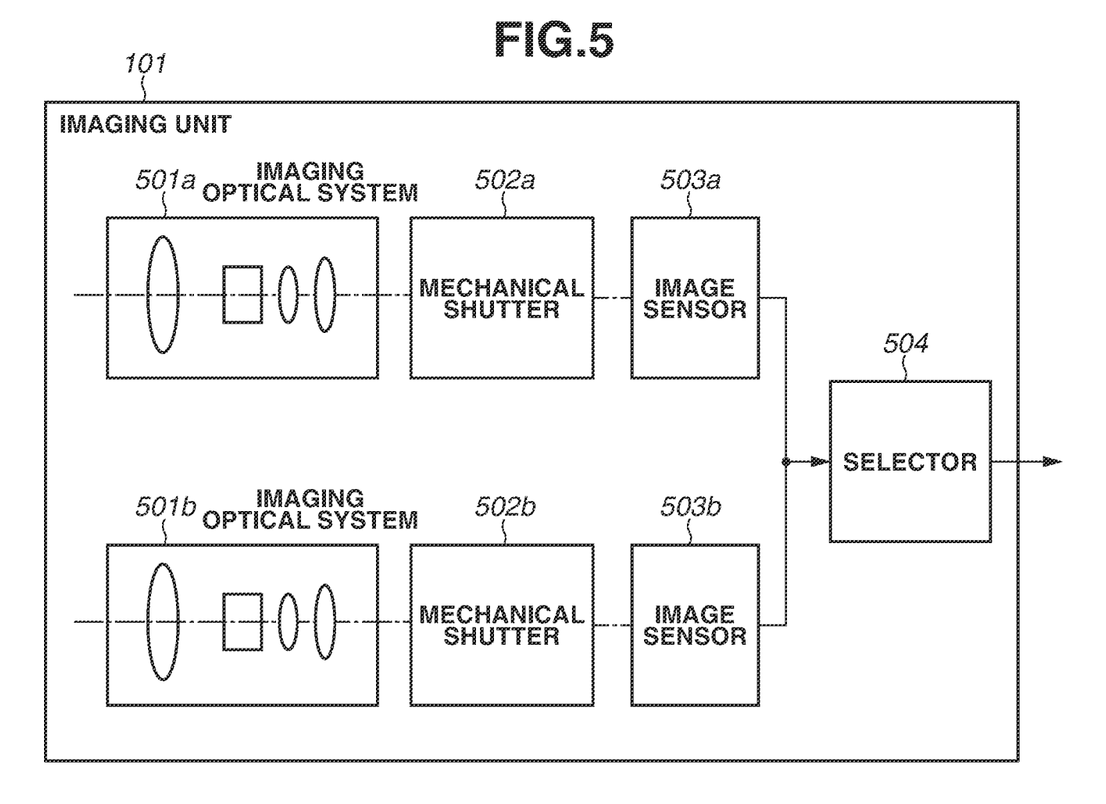
FIG. 5 illustrates a configuration of an imaging unit including a plurality of image sensors according to a second exemplary embodiment.

FIG. 5 illustrates a configuration of the imaging unit 101 according to the second exemplary embodiment. The configuration according to the present exemplary embodiment mainly differs from the configuration according to the first exemplary embodiment (FIG. 2) in that two imaging optical systems, two mechanical shutters, and two image sensors are provided.

The imaging unit 101 according to the second exemplary embodiment includes an imaging optical system 501a, a mechanical shutter 502a, an image sensor 503a, an imaging optical system 501b, a mechanical shutter 502b, an image sensor 503b, and a selector 504. The imaging optical system 501a, the mechanical shutter 502a, and the image sensor 503a form an imaging unit a while the imaging optical system 501b, the mechanical shutter 502b, and the image sensor 503b form an imaging unit b.

The selector 504 selects captured images of either one of the imaging units a and b, and outputs the selected captured images to the control unit 102 as captured images of the imaging unit 101.

The imaging unit a is used to perform wide-angle photographing, and the imaging unit b is used to perform macro photographing.

The control unit 102 controls the selector 504 to switch between macro photographing and wide-angle photographing.

Control Processing of Imaging Apparatus 100 According to Second Exemplary Embodiment Control processing of the imaging apparatus 100 according to the second exemplary embodiment will be described below.

When the control processing in FIG. 3 according to the first exemplary embodiment is started, the control unit 102 controls the selector 504 to select captured images of the imaging unit a on the wide-angle side in step S301, and captured images of the imaging unit b on the macro side in step S305. In step S402, the control unit 102 controls the selector 504 to select captured images of the imaging unit a on the wide-angle side. When the control processing in FIG. 4 according to the first exemplary embodiment is started, the control unit 102 controls the selector 504 to select captured images of the imaging unit b on the macro side in step S401. When the control unit 102 determines that the object has backed away to the predetermined position (YES in step S401), the processing proceeds to step S402. In step S402, the control unit 102 controls the selector 504 to select captured images of the imaging unit a. The control unit 102 also controls the focus adjustment unit 105 to focus on the detected person. Other control processing is similar to that illustrated in FIGS. 3 and 4, and redundant descriptions thereof will be omitted.

Even if the imaging unit 101 includes a plurality of imaging units in this way, the above-described control processing enables the performer to capture in-focus enlarged images and generate a moving image as intended by the performer. In this case, the performer as a person does not operate the camera but brings the object as a non-person subject close to the camera. Further, when registered images are superimposed on captured images, the performer can generate a moving image in which a person is in focus in other than the registered images.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-174675, filed Oct. 31, 2022, which is hereby incorporated by reference herein in its entirety.

What is claimed is:

1. An imaging apparatus comprising:
   an image sensor;
   a memory configured to store images; and
   at least one processor configured to function as the following units:
   a recognition unit configured to recognize a person based on images captured by the image sensor;
   an approach detection unit configured to detect approach of an object, different from the person, to the imaging apparatus;
   a determination unit configured to determine if the images stored in the memory are images of the object detected as approaching;
   a focus adjustment unit configured to adjust a focusing state of a focus adjustment target based on the images captured by the image sensor; and
   a generation unit configured to generate a moving image based on images of the person captured by the image sensor and images of the detected object stored in the memory,
   wherein, in a case it is determined that the images stored in the memory are the images of the detected object and it is further determined that the detected object has approached the imaging apparatus by a predetermined distance or more, the generation unit generates the moving images of the detected object using the images of the object stored in the memory.

2. The imaging apparatus according to claim 1, wherein, in a case where the approach of the object to the imaging apparatus by a predetermined amount or more is detected by the approach detection unit, the generation unit generates the moving image by using only images stored in the memory.

3. The imaging apparatus according to claim 2, wherein, in a case where the approach of the object to the imaging apparatus by a predetermined amount or more is detected by the approach detection unit, the generation unit generates the moving image by superimposing the images stored in the memory on the images captured by the image sensor.

4. The imaging apparatus according to claim 2, wherein, in a case where the apparatus of the object to the imaging apparatus by a predetermined amount or more is detected by the approach detection unit, the generation unit generates the moving image by replacing the images captured by the image sensor with the images stored in the memory.

5. The imaging apparatus according to claim 1, further comprising an interface circuit configured to connect the imaging apparatus with an external apparatus via a network, wherein the imaging apparatus transmits the moving image generated by the generation unit to the external apparatus connected wirelessly or wirelessly.

6. The imaging apparatus according to claim 1, further comprising a display control unit configured to control a display unit to display the moving image generated by the generation unit.

7. The imaging apparatus according to claim 1, wherein the memory stores the moving image generated by the generation unit.

8. The imaging apparatus according to claim 1, wherein execution of stored instructions further configures the at least one processor to operate as:
   a notification unit configured to, in a case where a subject distance is at a shortest focal position or in a vicinity of the shortest focal position, notify a user that the subject is at the shortest focal position or in the vicinity of the shortest focal position.

9. The imaging apparatus according to claim 1, wherein the focus adjustment unit changes the focus adjustment target when a distance between the object and the imaging apparatus is exceeded by a predetermined amount.

10. The imaging apparatus according to claim 2, wherein the predetermined amount is a shortest focal position.

11. The imaging apparatus according to claim 1, wherein the approach detection unit detects the approach based on a ratio of an object region to an angle of view in the images captured by the image sensor.

12. The imaging apparatus according to claim 1, wherein the approach detection unit detects the approach in a case where a subject distance is equal to or less than a predetermined distance for a predetermined time duration.

13. The imaging apparatus according to claim 1, wherein the approach detection unit detects the approach in a case where the approach detection unit determines that the subject is approaching based on a focus detection result.

14. A method for controlling an imaging apparatus having an image sensor for capturing images and a memory configured to store images, the method comprising:
   recognizing a person based on the images captured by the image sensor;
   detecting the approach of an object, different from the person, to the imaging apparatus;
   determining if the images stored in memory are image of the object detected as approaching;
   adjusting a focusing state of a focus adjustment target based on the images captured by the image sensor; and
   generating a moving image based on the images of the person captured by the image sensor and images of the detected object stored in the memory,
   wherein, in a case that it is determined that the images stored in the memory are the images of the detected object and it is further determined that the detected object has approached the imaging apparatus by a predetermined distance or more, moving images of the detected object are generated using the images of the object stored in the memory.

15. A non-transitory computer-readable storage medium storing instructions that when executed by at least one processor of an imaging apparatus having an image sensor for capturing images and a memory configured to store images, configure the imaging apparatus to perform a control method, the control method comprising:

recognizing a person based on the images captured by the image sensor;
detecting the approach of an object, different from the person, to the imaging apparatus;
determining if the images stored in memory are image of the object detected as approaching;
adjusting a focusing state of a focus adjustment target based on the images captured by the image sensor; and
generating a moving image based on the images of the person captured by the image sensor and images of the detected object stored in the memory,
wherein, in a case that it is determined that the images stored in the memory are the images of the detected object and it is further determined that the detected object has approached the imaging apparatus by a predetermined distance or more, moving images of the detected object are generated using the images of the object stored in the memory.

\* \* \* \* \*